United States Patent [19]

Grant

[11] 4,159,811
[45] Jul. 3, 1979

[54] TAPE TRANSPORT CARTRIDGE

[76] Inventor: Frederic F. Grant, 14505 Eastbrook, Bellflower, Calif. 90706

[21] Appl. No.: 743,594

[22] Filed: Nov. 22, 1976

[51] Int. Cl.² .................... G11B 15/32; G11B 23/10
[52] U.S. Cl. ................................................. 242/192
[58] Field of Search .................. 242/192, 67.5; 74/227

[56] References Cited

U.S. PATENT DOCUMENTS

| 3,692,255 | 9/1972 | Von Behren | 242/192 |
|---|---|---|---|
| 3,802,644 | 4/1974 | Maiershofer | 242/192 |
| 3,808,902 | 5/1974 | Grant | 74/227 |
| 3,907,230 | 9/1975 | Merle et al. | 242/192 |
| 3,942,743 | 3/1976 | Jinsenji | 242/192 |

FOREIGN PATENT DOCUMENTS

| 751075 | 12/1952 | Fed. Rep. of Germany | 242/192 |
|---|---|---|---|
| 860272 | 2/1961 | United Kingdom | 242/192 |

Primary Examiner—George F. Mautz
Attorney, Agent, or Firm—Grover A. Frater

[57] ABSTRACT

A belt driven tape cartridge employs a pair of tape reels on fixed spaced axes within a cartridge case and on which a tape extending between them is convolutely wound to form tape rolls. Tape is transported between reels when the reels are driven by a taut belt that extends between the rolls and around a drive roller at one side of a line connecting the tape reel axes and around an idler roller at the other side of that line. The drive roller rotates on a fixed axis which in preferred form is equidistant from the two tape reel axes. The idler roller rotates on an axis that is parallel with the other axes but is free to move laterally.

9 Claims, 6 Drawing Figures

TAPE TRANSPORT CARTRIDGE

This invention relates to improvements in belt driven tape cartridges.

BACKGROUND OF THE INVENTION

There is a need for a tape cartridge which houses a pair of tape reel hubs and a tape wound convolutely upon those hubs and extending between them together with an arrangement by which the hubs can be rotated to transport the tape between the reels past magnetic recording and readout heads. Tape cassettes were developed to fill that need. However, to construct a tape cassette suitable for use where very high fidelity is required has proven to be difficult. Thus, for example, it has been difficult to produce suitable tape cassettes for use in recording and playing back large quantities of digital data at reasonably high transport speeds. It has been difficult to produce a tape cassette in which the tape transport speed is maintained highly uniform and in which tension is maintained at the same level during starting and stopping and reversing operations at which it is maintained during tape transport.

To meet these requirements, the technique of driving the peripheral surfaces of the supply and take-up rolls was developed. To do that, while maintaining a uniform tension in the portion of the tape being transported from one roll to the other, requires that the take-up roll tend to be driven at a slightly faster speed than the speed at which the supply reel is driven. That can be accomplished with a drive belt which extends between a drive roller and an idler roller, and which is arranged so that a portion of the belt extends over the peripheral surface of each of the tape rolls. The belt must be coupled with some means for altering the belt speed at the two tape rolls, or some means must be provided for altering the speed at which the belt drives the rolls, so that the take-up roll tends to rotate faster than does the supply roll, whereby tension is maintained in the section of tape that is transported between them.

That differential in tape roll velocity is accomplished in Von Behran, U.S. Pat. No. 3,692,255 by frictionally opposing the idler roller. In Grant U.S. Pat. No. 3,808,902 it is accomplished with a belt having appreciable thickness and utilizing the difference in velocity of the inner and outer surfaces of the belt as it is transported from the drive roller to the tape rolls.

It is difficult in a system that employs a friction roller to develop a differential tape roll speed to maintain the friction uniform under changing environmental conditions, and it is difficult in such a system to prevent undamped oscillation of the drive belt, and therefore of the velocity at which tape is transported. Such systems suffer tape transport velocity change and the transport speed, or the data density on the tape, must be reduced. On the other hand, the general physical arrangement of the cartridge case, or shell, and the arrangement of the belt drive roller at one edge of the case that is depicted in the Von Behran patent provides a number of advantages, and that physical arrangement has enjoyed wide acceptance.

The Grant Radial Differential Tape Drive, described in U.S. Pat. No. 3,808,902, is capable of a superior performance, but the patent does not deal with the question of packaging that tape drive system in a cartridge case. To combine the case of Von Behran patent, or a case with similar advantages, with a drive system such as that shown in the Grant patent would be ideal.

SUMMARY OF THE INVENTION

It is an object of this invention to provide structural arrangements that make it possible to incorporate tape drive systems like that shown in the Grant U.S. Pat. No. 3,808,902, and similar drive systems, in tape transport packages like that shown in the Von Behran patent, or in similar packages. The result is a very stable tape transport system packaged in a very convenient and relatively inexpensive cartridge. In this connection, it is an object of the invention to provide a drive system that will provide superior performance in such a package, and that can be produced at reduced cost.

These and other objects and advantages of the invention which will hereinafter appear are realized, in part, by use of a drive system that employs two rollers, one a drive roller, and the other an idler, and an endless belt that extends from beginning point, around the drive roller, and then between the two tape packs of the cartridge, such that the periphery of one pack is engaged by the drive belt. Thereafter, the belt continues around the idler roller and back through the space between the two tape packs such that the belt engages the surface of the other of the packs, and thence back to the point of beginning. The drive belt is held taut. In the preferred form, it is pre-stressed, and that is conveniently accomplished by forming it of an elastomeric material which is stretched. The drive rollers and the tape packs rotate on fixed axes. The axis of the idler roller is free to move transversely in the cartridge. In one preferred form of the invention, the idler and the belt that surrounds it are drawn by the resilience of the belt into engagement with the surfaces of the two tape packs.

One object of the invention is to provide a belt drive transport system in which performance is uniform regardless of the proportions in which the tape is divided between the two tape reels. That object is realized in the invention by the use of two belt guide rollers, one disposed on either side of the plane containing the rotational axes of the tape rolls or packs. One, the drive roller, rotates on a fixed axis lying in the plane that bisects the plane containing the reel axes. The other tape guide roller is free to move transversely while its axis remains parallel to the other axes, and it engages, rather, the belt extending around it engages, both tape packs. The effect is that as tape is transported from one roll to the other, the amount of curvature of the belt as it moves over the packs is increased at the roll whose diameter is decreasing, and is decreased at the roll whose diameter is increasing. The effect is to keep tape speed differential uniform.

IN THE DRAWINGS

DESCRIPTION OF PREFERRED EMBODIMENTS OF THE INVENTION

Figure 1:
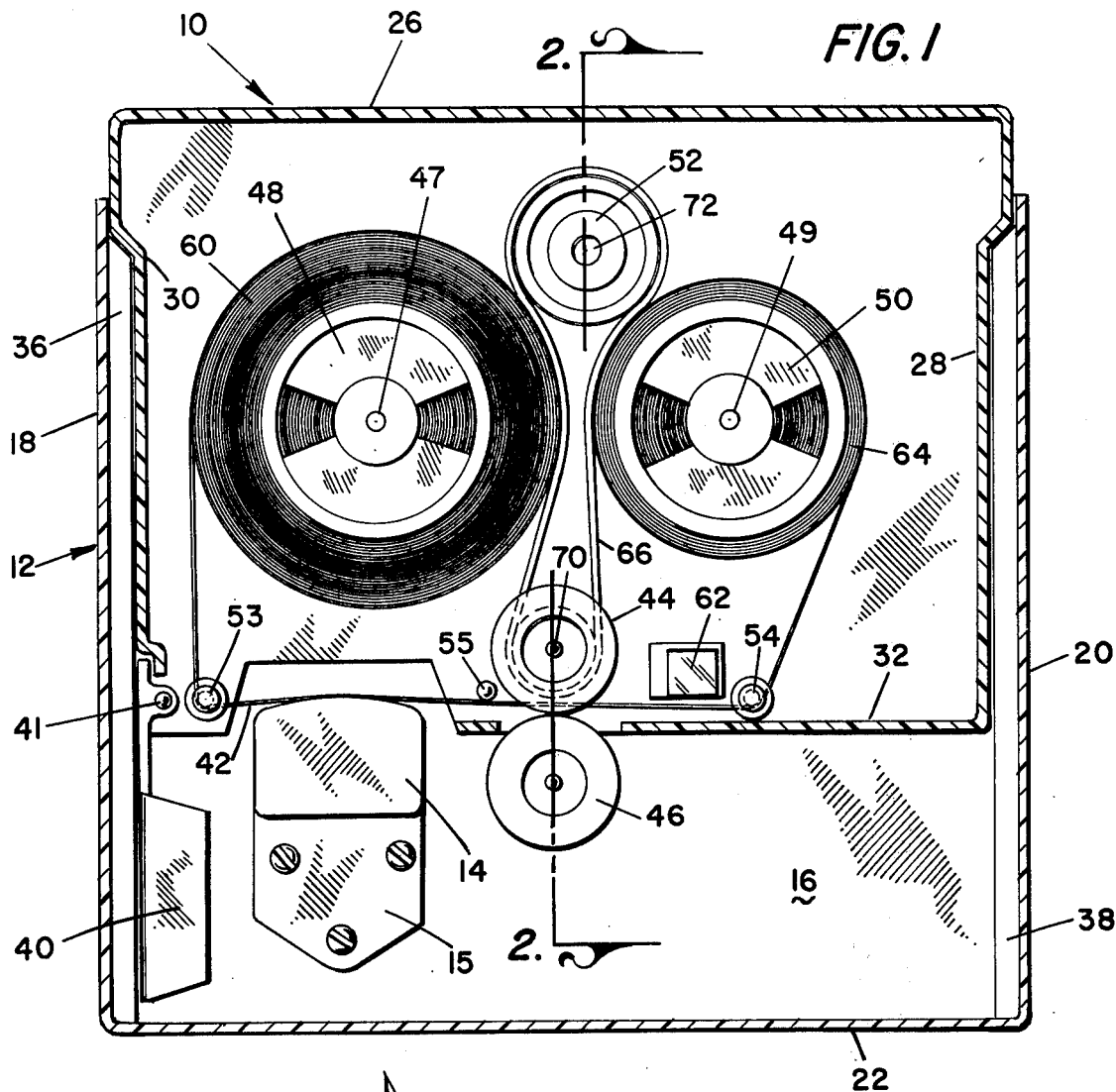
FIG. 1 is a top plan view of a cassette tape and drive system in a cartridge shell shown partly in section.
Figure 2:
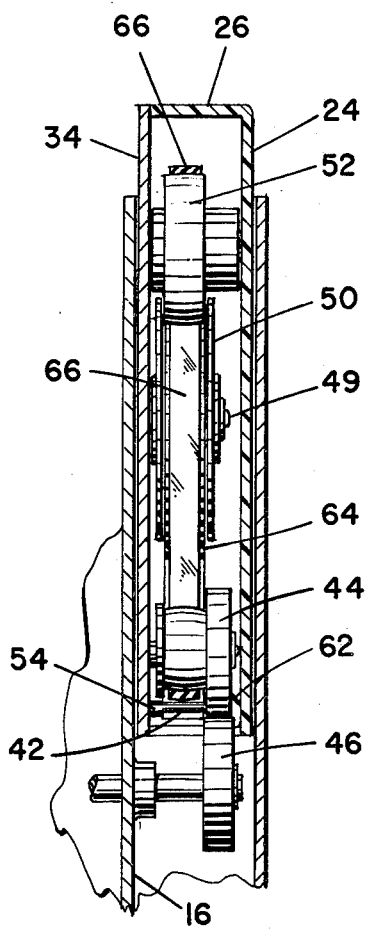
FIG. 2 is a cross-sectional view taken on line 2—2 of FIG. 1.

In FIG. 1, a cassette, or cartridge, generally indicated 10, is disposed in operating position within the cartridge recepticle 12 of an apparatus in which the cassette 10 is to be operated. That recepticle includes a recording and play-back head 14 which is mounted by a bracket 15 to the base 16 of the recepticle. The cover 17 (see FIG. 2) of the recepticle has been removed to reveal that the receptacle has side walls 18 and 20, and a rear wall 22. The front, or upper side, in FIG. 1 is open to receive the cartridge 10.

The upper wall 24 of the cartridge 10 has been removed in FIG. 1 to reveal its interior and the fact that the unit has a rear wall 26, side walls 28 and 30, a forward wall 32, and a lower wall, or base, 34. The side walls 18 and 20 of the receptacle 12 are formed with inwardly projecting ridges 36 and 38, respectively, whose function is to guide the cartridge into the receptacle and, in the case of rib 36, to cam open a spring closed gate 40. The gate rotates on a pivot axis 41 at the lower left of the cartridge in FIG. 1. When the cartridge is removed from the receptacle, that gate is spring closed so that it covers a window in the front wall 32 of the cartridge. When the gate is open, the tape 42 is exposed, and when the cartridge is in place in the receptacle, the tape is engaged by the magnetic recording and reading head 14 in the fashion shown.

The degree of insertion of the cartridge is limited by stops formed as conformations of the side walls 28 and 30, and it is also limited by engagement of a drive roller 44, carried by the cartridge 10, with a drive puck 46. The drive puck is mounted for rotation on the base 16 of the receptacle 12. The drive puck 46 and the belt drive roller 44 rotate on parallel axes perpendicular to the base plates 16 and 34, respectively. Those axes are parallel to the axis 47 of a first tape reel 48, and the axis 49 of a second tape reel 50. They are also parallel to the axis of rotation of an idler roller 52, each of a pair of guide rollers 53 and 54, and a guide pin 55.

Part of the tape 42 is wound outside side out upon the first tape reel 48 to form a tape pack or roll identified by the reference numberal 60. It extends from the reel over the guide roller 53, over the face of the magnetic head 14. From there, it extends over the guide pin 55 and then past the smaller diameter, underside of drive roller 44 without touching the roller. It then passes a diagonal mirror 62 which cooperates with a light source and holes in the tape to locate positions along the tape. Thereafter, the tape 42 passes over the guide roller 54 to the reel 50 where it becomes part of the tape roll, or pack, wound upon the reel 50 and here designated 64.

The tape packs are driven so that tape is transported from tape roll 60 to tape roll 64 and back by a belt 66 which extends from a point of beginning to and around the drive roller 44, between the two tape packs such that the outer surface of the belt bears against an arcuate portion of the outer periphery of the tape pack 64. Thereafter, the drive belt 66 extends around the outer periphery of the idler roller 52 and back between the two tape packs to the point of beginning. The outer surface of the tape also engages an angular segment of the outer periphery of the tape pack 60.

A means is provided for maintaining the belt 66 in taut condition so that it bears against the tape pack 64 and 60 sufficiently to drive them to rotation as the belt is rotated. In the embodiment shown, the belt is made of an elastomeric material that is maintained taut by being stretched. The drive roll 44 is mounted for rotation on its fixed axis 70, but the axis 72 of the idler roller 52 is not fixed. The idler roller is free to move transversely within the cartridge housing, or shell, 26. Accordingly, in view of the fact that the belt 66 is made of elastic and is stretched, the idler roller 52 is drawn toward the two tape packs so that it, and the portions of the belt that surround it, are drawn into engagement with the two tape packs.

OPERATION OF THE INVENTION

When the cartridge is assembled in the receptacle so that the drive puck 46 is in engagement with the belt drive roller 44, rotation of the puck results in rotation of the drive roller. That results in rotation of the belt 66. The belt engages segments of the outer peripheral surfaces of both of the tape packs 60 and 64. Belt rotation is translated into rotation of the two tape packs. They rotate in like direction, but the tape is wound oppositely on the reels whereby it is transported from one tape roll to the other. The portion of the tape being transported is that extant of the tape 42 which begins at the point where the tape leaves, or joins, the pack 60, and ends at the point at which the tape leaves, or joins, the pack 64. To ensure that that section of tape is maintained under tension, the take-up roll must tend to rotate at a higher peripheral velocity than does the periphery of the supply tape roll. That is what happens in the unit illustrated in the drawing. If there is slack in the section of tape being transported, the take-up reel will actually rotate with higher peripheral velocity than does the supply tape pack. That will continue, as the drive belt 66 is rotated, until the slack is taken up and the tape becomes taut. Thereafter, the actual peripheral speed of the two tape packs will be maintained uniform, but the belt 66 will impact a force to the take-up reel that tends to make it rotate more rapidly than does the supply reel when tension is maintained. The belt under shear load between idler roller 52 and tape pack 60, and the corresponding portion between idler 52 and pack 64, will yield in shear to regulate the tension of tape 42 and transport it at a velocity approximating the mean velocity of the belt.

The action is the same regardless of which way the tape is being transported. When the puck 46 rotates clockwise, the drive roller 44 and the belt 66 rotate in the counterclockwise direction. Both tape packs are turned in the clockwise direction and the tape is transported from pack 64, acting as the supply roller, and it is wound upon the tape pack 60 which serves as the take-up roll. In that circumstance, the action of the belt 66 is such that it tends to drive pack 60 at greater peripheral speeds than the speed at which the periphery of pack 64 is driven. If the direction of rotation of puck 46 is reversed, so that it rotates in a counterclockwise direction, the drive roller 44 and the drive belt 66 will rotate in the clockwise direction. Both tape packs will rotate in the counterclockwise direction. However, in that circumstance, it is the tape pack 64 that is the take-up pack, or roll, and it will tend to be driven at higher speed.

Figure 5:
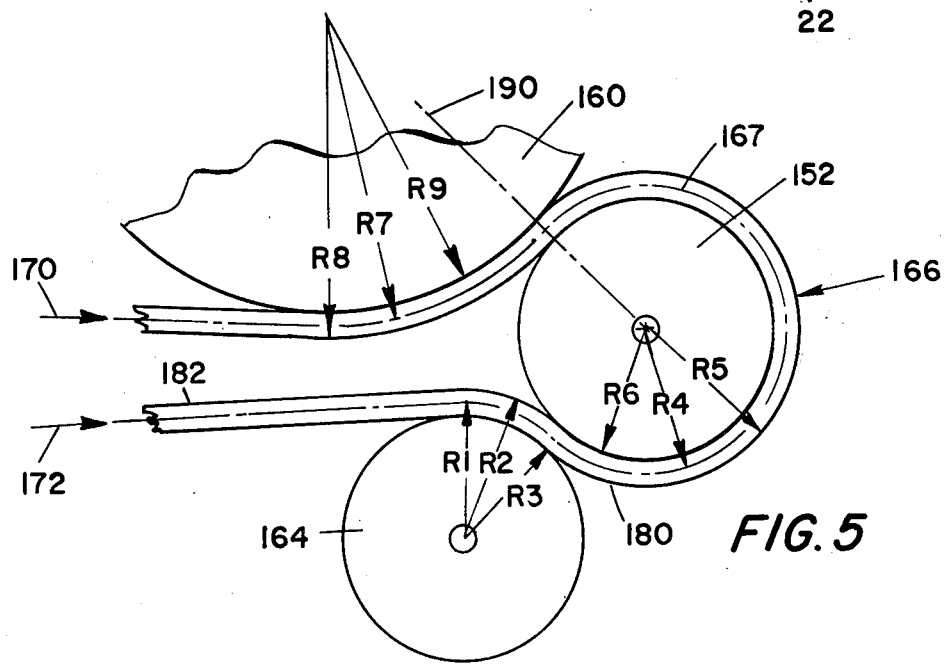
FIG. 5 is a diagram illustrating the principle of operation of the invention.

This differential in velocity effect can be understood by reference to FIG. 5. In that figure, the circle 164 represents tape pack 64. The segment 160 of a circle represents the tape pack 60, and the belt 166 represents belt 66 of FIG. 1. The circle 152 represents the idler roller 52 of FIG. 1. The dotted line 167 represents the mid-plane through the length of the belt 166. When belt 66 of FIG. 1 is rotated, the mid-plane of the belt is moved at a velocity that is the same throughout the entire length of the belt. The dotted line 167 represents the same mid-plane of belt 166. Every part of the belt that lies on that line moves at uniform velocity, whether the belt is moved at uniform velocity in the clockwise direction, as indicated by arrow 170, or whether the belt moves in the counterclockwise direction as indicated by arrow 172. Let it be assumed that the belt 166 is rotating in the counterclockwise direction in FIG. 5, as indicated by arrow 172. The distance from the center of rotation of tape pack 164 to the mid-line 167 is indicated by arrow R-1. The distance from that center to the near surface 180 is shown by the arrow R-3. The distance from that center of rotation to the far side 182 of the belt is depicted by the arrow R-2. As the belt moves, it will drive the tape pack 164 to rotation, and the rotational velocity will be determined by the velocity of the side of 166 which engages the peripheral surface of the tape pack 164. That velocity will be equal to the velocity of the mid-line times the ratio of the length of arrow R-3 to the length of arrow R-1. Thus it is that the velocity of rotation of the periphery of tape pack 164 will be less than the velocity of the drive belt at its mid-line.

The velocity of the far surface 182 of the belt will be equal to the velocity of the mid-line times the ratio of the length of arrow R-2 to the length of arrow R-1. Quite obviously, the speed of surface 182, as it bends past tape pack 164 and approaches the outer peripheral surface of idler roller 152, is greater than the velocity of the mid-line. The idler roller 152 is located, relative to the tape pack 164, so that they are separated only by the thickness of the belt 166. Because of that physical arrangement, the surface 182 of the belt 166 enters into contact with the peripheral surface of the idler reel 152 at a velocity greater than the velocity of the mid-line of the belt, and greater than the velocity of the periphery pack 164. But is is at this point that the surface 182 drives the idler wheel 152. Surface 182 will slow down after it begins to curve in the opposite direction. However, the peripheral speed of the idler 152 will correspond to the speed of surface 182 at the point at which it makes contact with the idler. Thus, the idler will rotate somewhat faster than the surface speed of the surface 182 after the belt is bent in the counterclockwise direction as it proceeds around the idler.

The idler rotates and rotation is imparted to it at the point at which the belt is compressed slightly between the tape pack 164 and the idler roller 152.

The rotational speed of idler 152 is of no moment except as an aid to understanding that the same effect is experienced at the point at which the belt is compressed slightly between idler 152 and the take-up reel 160. As the belt 166 rounds the idler 152, its exterior portion is placed under tension. The outer part of the belt is stretched so that the surface 180 is longer than the mid-line 172. As a consequence, its velocity exceeds that of the mid-line. The same rule applies as before. The velocity of the surface 180 as it rounds the idler 152 is equal to the velocity of the mid-line 167 of the belt times the ratio of the length of arrow R-5 to the length of the arrow R-4.

Construction line 190 connects the axis of rotation of the idler 152 with the axis of rotation of the take-up tape pack 160. The tape is compressed between the idler and the take-up pack along that construction line. It is in the region of the inner section of that construction line and the outer periphery of the take-up pack 160 that motion of the outer surface 180 of the belt is imparted to the take-up pack. Since the velocity of the outer surface exceeds the velocity of the center line of the belt, the tape pack 160 will be driven at a velocity greater than the velocity of the mid-line. Thus it is that the velocity of the supply tape pack 164 is less than the velocity of the mid-line of the drive belt, and the velocity of the take-up tape pack 160 is greater than the velocity of the mid-line of the drive belt.

The phenomenon having been thus explained, it is apparent that the tension that will be experienced in the tape being transported from one reel to the other is accounted for, in part, by a slowing of the supply reel and a speeding up of the take-up reel. Since the difference between the tape pack speeds, and the speed of the center line of the belt, is a function of the ratio of the radius from the mid-line of the belt to the radius to the near side of the belt, it will be apparent that the slow down effect at the supply reel is greatest when the diameter at the supply roll is small. However, the velocity increase at the take-up reel is accounted for by the belt surface speed increase at the idler roll, and that does not change. The ratio of the several radii at the idler wheel remains constant regardless of the diameters of the two tape packs. As a consequence of that, the effect upon tension would appear to vary as the tape is transported and the relative diameter of the tape packs is changed. In the invention, that effect is minimized to a point at which it has no significance by the relative placement of the tape reels and the belt drive elements.

Figure 3:
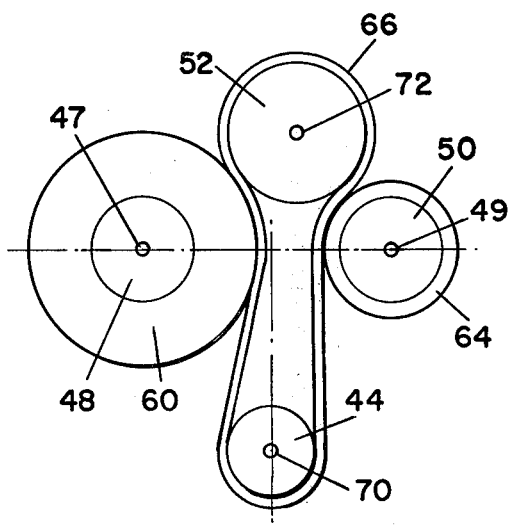
FIGS. 3 and 4 are diagrams illustrating how the elements of the drive system are displaced when tape is transported from one reel to the other of the apparatus illustrated in FIG. 1.
Figure 4:
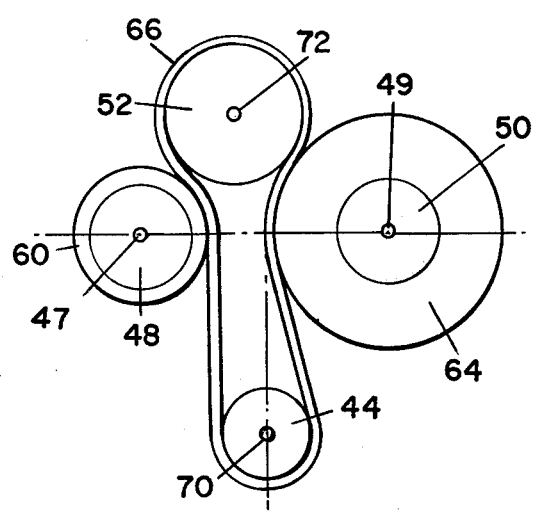

The preferred physical arrangement does result in a small change in belt length, and thus, in the degree of belt tension as tape is transported from one reel to the other. However, the belt tension can vary over a wide range without any deleterious change in the degree of tape tension. Since there is no short term change in tension, the velocity of the tape is unaffected by any small tension change. A comparison of FIGS. 3 and 4 will illustrate that the change in degree of bending of the drive belt as the tape is moved from one pack to the other is minimized if the drive roller 44 is located on a line that bisects a line between the axis of the two tape packs. That construction results in a symmetry that prevents one tape pack from becoming wound more tightly as the tape is transported back and forth from one pack to the other. It has another advantage. Since the peripheral speeds of the two tapes must remain constant in operation, except to take up slack if the tape 42 should be pushed or pulled to introduce slack at the window where the tape is engaged by the tape head, there must be yielding between the belt and the tape packs and the idler roller. That yielding is minute, and it goes on automatically during operation of the unit.

Because the belt extends over a portion of the surface of both tape packs, it tends to exhibit a somewhat deleterious effect. That portion of the belt that extends over the surface of the take-up reel tends to oppose generation of the increase in tension. That portion of the belt that engages and extends over a portion of the peripheral surface of the supply reel contributes to tension, but that contribution is somewhat deleterious because it varies with supply pack size. However, the difference is rendered inconsequential in the arrangement shown in which the belt is driven by a drive roller that is removed from the two tape packs. There are straight portions of the belt leading to and running from that drive roller, and uniform and continuous belt yielding results. As a consequence of that physical arrangement, the drive technique, which is the subject of Grant U.S. Pat. No. 3,808,902 can be successfully packaged within a cassette or cartridge housing of the kind illustrated in the drawings. That does not mean that the drive system cannot be packaged in other fashion, but it does mean that it can be packaged in a cartridge in which both the drive roller and the section of tape to be subjected to the magnetic head can be arranged at the same face of the cartridge. That means that the pressure between the tape head and the tape, and the pressure between the drive puck and the drive belt roller are made independent of most of the physical dimensions of the cartridge, whereby a high degree of uniformity in performance from cartridge to cartridge can be achieved.

Figure 6:
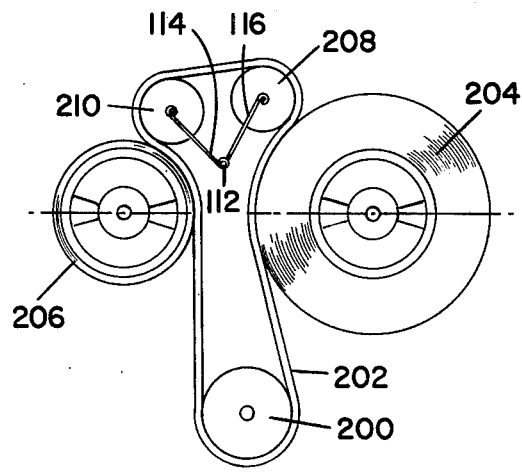
FIG. 6 is a diagram of an alternative form of the invention.

Another physical form of the invention is shown in FIG. 6. It, too, can be packaged in the same, or similar, cartridge forms. It includes a drive roller 200, a drive belt 202, and a pair of tape packs 204 and 206. The idler roller has been replaced with two idler rollers identified by the referene numerals 208 and 210. In this case, the idler rollers are mounted on cantilever springs which are fixed to a rotatable post 112 which lies generally between the two tape packs at a position where it will not be engaged by either pack. The spring 114 extends from the post 112 to the axis of idler 210, and the idler is free to move as the spring cantilevers back and forth. The same is true of spring 116 which extends from a fixed connection at post 112 to the axis of idler 208. This is but one of a number of alternative constructions that are possible within the invention. It is selected for illustration because it illustrates that the belt 202 need not be made of an elastomeric material. It can be made of a metal, such as the metal nickle, so that it exhibits resilience, but will not stretch in appreciable degree. Alternatively, the belt 202 can be made of a pliant non-resilient material such, for example, as cloth. It is the difference in surface speeds of the belt surfaces, rather than any elastic quality in the belt, that accounts for the development in tension of the tape being transported between the tape pack. Obviously, then, the degree in which the tension effect is exhibited is determined, in part, by the thickness of the belt. However, the thickness is not critical because the effect need be exhibited only in very small degree. There is one advantage in using an elastomeric belt. Such a belt can distort and shear so that some of the differential in belt surface speeds that would otherwise need to be accounted for by slippage, can be accounted for by distortion of the belt in shear. Thus it is that the use of a soft belt of rubber-like material is preferred.

While I have shown certain specific embodiments of the invention, it will be apparent that others are possible, and it will be apparent that the invention is not limited to magnetic tape units, but is applicable to photographic film strips and various other kinds of tape.

I claim:
1. A tape cartridge comprising:
   shell means defining an enclosure having a cutaway portion along one edge;
   a pair of reel hubs supported for rotation on spaced, parallel axes within said enclosure;
   means defining a tape path extending between said hubs from that side of a first one of said hubs which is away from the other to the side of a second one of said hubs which is away from the first and past said cutaway portion of the enclosure;
   a length of tape extending along said path with its sensitive surface facing toward said edge and being wound convolutely around said hubs to form two tape rolls, one on each hub;
   driving means for driving said tape rolls such that one tends to revolve faster than the other by utilizing the difference in velocity at the opposite faces of a drive belt as it is moved through an arc;
   said driving means comprising a first roller supported within said housing on a fixed axis located at the side of said tape rolls toward said edge of said enclosure;
   said driving means further comprising a second roller disposed on an axis parallel with that of said first roller and said hubs and being translatable within said enclosure at the side of said tape rolls away from said edge; and
   said driving means further comprising an endless flexible belt having an inner surface and an outer surface and extending around said first roller with a portion of its inner surface in engagement with an arcuate portion of the outer surface of one of said tape rolls to a point of disengagement from said one of said tape rolls and thence around said second roller with its inner surface in engagement with the outer surface of said second roller from a point of engagement opposite said point of disengagement from said second roller and thence extending between said tape rolls from a point of engagement opposite the point of disengagement of said belt from said second roller and thence back to said first roller;
   said belt having a length such that it engages said tape rolls and said rollers without significant slipping and without significant differential stretching along its length.

2. The invention defined in claim 1 in which said drive means comprises a resilient means for maintaining said drive belt taut.

3. The invention defined in claim 2 in which said drive belt is comprised of an elastomeric material exhibiting resilience in the direction of the length of the belt and in which said means for maintaining said drive belt taut includes the resilience of the drive belt such that the degree of elongation at each portion of the belt is substantially uniform.

4. THe invention defined in claim 1 in which said second roller has a diameter greater than the separation of said tape rolls and is urged toward them such as to cause the drive belt to engage the surface of both tape rolls.

5. A tape cartridge comprising:
   shell means defining an enclosure having a cutaway portion along one edge;
   a pair of reel hubs supported for rotation on spaced parallel axes within said enclosure;
   means defining a tape path within said enclosure extending between said reel hubs along one edge of said enclosure and across said cutaway portion from the outer side of one hub to the outer side of the other;
   a length of tape extending along said tape path, said tape being convolutely wound on said reel hubs such as to form a tape roll on each hub;
   a belt driving roller supported within said enclosure for rotation about a stationary axis parallel to the axes of said reel hubs, said driving roller being spaced from said reel hubs and being positioned on a line perpendicularly bisecting a line joining the axes of said reel hubs;

drive belt means comprising a belt disposed to pressurally engage both tape rolls sufficiently to effect rotation of the rolls on the carriers as the belt is rotated in order to accomplish transport of the tape between said rolls; and drive means for driving said belt at increased velocities in the region proximate the loci of engagement of the belt with said tape rolls, such that the tape section undergoing transportation between said rolls is maintained in tension, said drive means comprising said belt, said belt driving roller, and an idler roller about which said belt extends and which idler roller is rotatable on an axis parallel with the axes of said belt driving roller and said hubs and translatable within said shell means as an incident to change in the diameter of said tape rolls as tape is transported between them;

said belt being maintained in tension but having a length such that it experiences no significant differential extension at different points along its length during rotation.

6. The invention defined in claim 5 in which said belt extends from a point on its length around said belt driving roller, between said tape rolls and against one of said rolls, around said idler roller and thence between said tape rolls against the other of said rolls back to said point.

7. The invention defined in claim 6 in which said belt is made of elastomeric material and is maintained in tension by being stretched uniformly throughout its length.

8. The invention defined in claim 6 in which said idler roller, and the tape extending around it, are urged into engagement with the outer periphery of both of said tape rolls.

9. The invention defined in claim 6 which includes a second idler roller, said belt extending around both, and which further comprises spring means including springs on which both of the idler rollers are mounted for urging the rollers apart such that said belt is stressed in tension.

* * * * *